United States Patent
Zhao et al.

(10) Patent No.: US 9,912,512 B2
(45) Date of Patent: Mar. 6, 2018

(54) SYSTEMS AND METHODS FOR FREQUENCY SYNCHRONIZATION BETWEEN TRANSMITTERS AND RECEIVERS IN A COMMUNICATION SYSTEM

(71) Applicant: Hong Kong Applied Science and Technology Research Institute Co., Ltd., Shatin, New Territories (HK)

(72) Inventors: Shaohua Zhao, Tuen Mun (HK); Wuxue Ni, Shenzhen (CN); Biqiang Luo, Tin Shui Wai (HK); Li Li, Shatin (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 82 days.

(21) Appl. No.: 15/063,085

(22) Filed: Mar. 7, 2016

(65) Prior Publication Data
US 2017/0257248 A1    Sep. 7, 2017

(51) Int. Cl.
*H04J 3/00* (2006.01)
*H04L 27/26* (2006.01)
(Continued)

(52) U.S. Cl.
CPC .......... *H04L 27/2663* (2013.01); *H04L 27/06* (2013.01); *H04L 7/04* (2013.01)

(58) Field of Classification Search
CPC . H04L 27/2663; H04L 72/06; H04L 72/2601; H04L 7/04
See application file for complete search history.

(56) References Cited

U.S. PATENT DOCUMENTS 6,546,026 B1    4/2003  Goeddel
7,039,132 B1    5/2006  Chen et al.
(Continued)

FOREIGN PATENT DOCUMENTS

CN    101277288 A    10/2008
CN    101277290 A    10/2008
(Continued)

OTHER PUBLICATIONS

International Search Report and Written Opinion issued for PCT/CN2016/077403, dated Nov. 28, 2016, 11 pages.
(Continued)

*Primary Examiner* — Abdelnabi O Musa
(74) *Attorney, Agent, or Firm* — Norton Rose Fulbright US LLP

(57) ABSTRACT

Systems and methods which provide training sequence or preamble-based synchronization with respect to non-coherent modulated signals and/or differentially coherent modulated signals are described. Embodiments provide for time synchronization using a technique for mitigating the effect of carrier frequency offset (CFO) with respect to the received signal. Embodiments of the present invention provide for frequency synchronization using a technique for estimating CFO using a constant bias induced with respect to the received signal by CFO. Additionally or alternatively, embodiments of the present invention provide for frequency synchronization using a technique for estimating CFO using phase rotation caused by CFO. The time synchronization and frequency synchronization of embodiments may be performed independently, without requiring the results of one synchronization operation for performing the other synchronization operation.

32 Claims, 8 Drawing Sheets

(51) Int. Cl.
*H04L 27/06* (2006.01)
*H04L 7/04* (2006.01)

(56) References Cited

U.S. PATENT DOCUMENTS

| | | | |
|---|---|---|---|
| 7,254,202 | B2 | 8/2007 | Cattaneo et al. |
| 8,605,830 | B2 | 12/2013 | Sethi et al. |
| 8,948,320 | B2 | 2/2015 | Ray et al. |
| 8,989,321 | B1 | 3/2015 | Zhou et al. |
| 9,419,785 | B1 * | 8/2016 | Lin ................. H04B 1/707 |
| 2004/0076246 | A1 * | 4/2004 | Vanderperren ..... H04L 27/2675 375/343 |
| 2010/0183054 | A1 * | 7/2010 | Daly ................. H04L 25/03006 375/219 |
| 2013/0058391 | A1 | 3/2013 | Hou |
| 2013/0195212 | A1 * | 8/2013 | Wang ................. H04B 7/024 375/260 |
| 2015/0110231 | A1 * | 4/2015 | Alexander ......... H04L 27/2657 375/362 |

FOREIGN PATENT DOCUMENTS

| | | |
|---|---|---|
| CN | 101455008 A | 6/2009 |
| CN | 101753505 A | 6/2010 |
| CN | 102238124 A | 11/2011 |
| CN | 102946371 | 2/2013 |
| CN | 103873415 A | 6/2014 |
| EP | 1414208 A1 | 4/2004 |
| WO | WO-2003055127 | 7/2003 |
| WO | WO-2009/018655 A1 | 2/2009 |
| WO | WO-/2014/128019 A1 | 8/2014 |

OTHER PUBLICATIONS

Han, et al., "An Improved Frequency Offset Estimation Algorithm for IEEE 802.11a System." Journal of Computational Information Systems 6:8(2010) pp. 2633-2641.

International Search Report and Written Opinion issued for PCT/CN2016/077670, dated Dec. 22, 2016, 11 pages.

* cited by examiner

SYSTEMS AND METHODS FOR FREQUENCY SYNCHRONIZATION BETWEEN TRANSMITTERS AND RECEIVERS IN A COMMUNICATION SYSTEM

CROSS-REFERENCE TO RELATED APPLICATIONS

The present application is related to co-pending U.S. patent application Ser. No. 15/063,030, entitled "SYSTEMS AND METHODS FOR TIME SYNCHRONIZATION BETWEEN TRANSMITTERS AND RECEIVERS IN A COMMUNICATION SYSTEM," filed concurrently herewith, the disclosure of which is hereby incorporated herein by reference.

TECHNICAL FIELD

The present invention relates to synchronization between transmitters and receivers and, more particularly, to training sequence or preamble-based synchronization in communications using non-coherent modulation techniques and/or differentially coherent modulation techniques.

BACKGROUND OF THE INVENTION

The use of digital data communication has become widespread to the point of nearly being ubiquitous. For example, digital communications are routinely implemented in providing data communications in various systems, such as computer network systems (including personal area networks (PANs), local area networks (LANs), metropolitan area networks (MANs), wide area networks (WANs), the Internet, etc.) and communication systems (including the public switched telephone network (PSTN), cellular networks, cable transmission systems, etc.).

In operation of such digital data communications, binary information is transmitted from a transmitter, through a transmission medium, to one or more receivers. For example, a data source at the transmitter may provide a signal (e.g., a voice signal, a video signal, a multimedia signal, etc.) that is digitized and then modulated by varying one or more parameters (e.g., frequency, phase, or amplitude) of a particular carrier wave (e.g., a square wave or sinusoidal wave), whereby the modulated carrier wave is transmitted into the transmission medium. Non-coherent modulation techniques, such as frequency-shift keying (FSK), and differentially coherent modulation techniques, such as differential phase-shift keying (DPSK), are used for digital data communications in many applications including code division multiple access (CDMA) communication systems. The receiver, upon receiving the modulated carrier wave via the transmission medium, demodulates and decodes the signal. However, the transmitted signal may be corrupted or otherwise degraded by noise, interference, and/or distortion in the transmission medium. Accordingly, the receiver demodulates and decodes the degraded signal, as received by the receiver, to make an estimate of the original data.

Further complicating the ability of the receiver to accurately estimate the original data from the received degraded signal is that the transmitter and receiver are typically not synchronized. For example, clocks implemented by the transmitter and receiver with respect to the carrier wave may not be synchronized, propagation delays may introduce timing differences with respect to the signals at the transmitter and receiver, etc., thereby presenting issues with respect to timing synchronization. Similarly, manufacturing differences with respect to crystals, mixers, and other circuitry may introduce frequency differences presenting issues with respect to frequency synchronization. Accordingly, synchronization of the received signal at the receiver is often important, whereby timing, phase, and/or frequency synchronization is performed in order to accurately retrieve the original data. In packet-based communication systems in particular, time and frequency synchronization is often critical for efficient transmission, wherein time synchronization determines the boundary of a symbol of the received signal and frequency synchronization estimates and compensates for the carrier frequency offset (CFO) between the transmitter and receiver.

In performing digital communications with a transmitter, a receiver may thus operate to interpret a received signal for establishing timing and frequency synchronization with the transmitter. For example, when a user switches on a mobile cellular phone to communicate with a base station, the mobile phone receiver may operate to synchronize its timing and the frequency with the base station transmitter. The synchronization functions of the receiver are thus generally tied to the received signal whereby the synchronization information is derived from the received signal.

A number of techniques for time and frequency synchronization have been utilized with respect to FSK and DPSK modulated signals. However, these techniques have generally not been well suited for use with respect to some communication scenarios or communication system configurations. For example, the existing time and frequency synchronization techniques are often not compatible with low complexity circuit configurations, low power receiver configurations, or communication systems implementing short duration training sequences. Moreover, some such techniques are often not suitable for providing high performance operation.

One technique for frequency synchronization, as shown in U.S. Pat. Nos. 8,605,830 and 8,948,320 (the disclosures of which are incorporated herein by reference), uses Fourier transforms to perform frequency synchronization in the frequency domain. However, implementation of Fourier transforms requires high computational complexity, resulting in the utilization of appreciable die size for the circuitry and relatively high power consumption. Accordingly, such techniques are not well suited for use in low power configurations (e.g., BLUETOOTH low energy (BLE) systems), configurations having relatively limited resources and relatively low complexity circuit configurations (e.g., some application specific integrated circuit (ASIC) or field programmable gate array (FPGA) circuit implementations), and the like.

Another technique, as shown in U.S. Pat. No. 7,039,132 (the disclosure of which is incorporated herein by reference), uses a clock recovery algorithm (e.g., an early-late gate algorithm) for time synchronization. Such clock recovery algorithms, however, generally require a long training sequence for the algorithm to converge. Accordingly, such techniques are not well suited for use in system configurations implementing short duration training sequences (e.g., BLE systems).

Yet another technique, as shown in U.S. Pat. No. 7,039,132 (the disclosure of which is incorporated herein by reference), uses a joint frequency and time synchronization technique. In this technique, the estimation of time synchronization is based on the result of frequency synchronization. Accordingly, the residue of the frequency estimation will degrade the performance of time synchronization. Such a technique thus does not provide high performance operation in many scenarios, particularly in situations where the frequency estimation is poor.

BRIEF SUMMARY OF THE INVENTION

The present invention is directed to systems and methods which provide training sequence or preamble-based synchronization with respect to non-coherent modulated signals (e.g., FSK modulated signals) and/or differentially coherent modulated signals (e.g., DPSK modulated signals). For example, embodiments of the invention provide training sequence-based methods for time and frequency synchronization for FSK systems (e.g., BLE systems, Z-WAVE systems, CDMA systems, global system for mobile (GSM) communication systems, emergency alert systems, etc.) and/or DPSK systems (e.g., wireless LAN systems, BLUETOOTH systems, radio frequency identification (RFID) systems, orthogonal frequency-division multiplexing (OFDM) systems, ZIGBEE systems, etc.).

In operation according to embodiments of the invention, time synchronization and frequency synchronization are performed independently, without requiring the results of one synchronization operation for performing the other synchronization operation. Accordingly, residue or errors in one synchronization result are not carried into the other synchronization result. Moreover, embodiments may operate to perform the time and frequency synchronization techniques implemented in some configurations in parallel or partially in parallel.

Embodiments of the present invention provide for time synchronization using a technique for mitigating the effect of CFO with respect to the received signal. For example, embodiments utilize a second-order differential of a received training sequence to mitigate the effect of CFO in performing time synchronization. Operation in accordance with embodiments implements a cross-correlation with respect to results provided by the aforementioned second-order differential and results derived from a local sequence (e.g., a local instance of the training sequence). For example, a cross-correlation may be performed between the second-order differential vector and a vector of the local sequence to estimate the symbol boundary according to embodiments. In particular, embodiments of the invention may utilized the vector of the sign of the local sequence, whereby the sign vectors are cross-correlated, to provide a low complexity circuit implementation that provides highly reliable symbol boundary estimates.

Embodiments of the present invention provide for frequency synchronization using a technique for estimating CFO using a constant bias induced with respect to the received signal by CFO. The constant bias induced by CFO in a differential sequence of the received signal may be utilized for frequency synchronization according to embodiments. For example, the constant bias induced by CFO in the first-order differential of received training sequence is utilized in providing frequency synchronization in accordance with some embodiments of the invention.

Additionally or alternatively, embodiments of the present invention provide for frequency synchronization using a technique for estimating CFO using phase rotation caused by CFO. For signals repeated with a time interval, the phase rotation caused by CFO may be utilized for frequency synchronization according to embodiments. For example, where a training sequence is a repetitive pattern, CFO can be estimated from an inner product between two portions of the received repeated signal.

Some configurations of the foregoing time and/or frequency synchronization techniques may be implemented using essentially only shifters and adders according to embodiments. Such implementations are particularly well suited for low power and low cost systems. Nevertheless, implementations in accordance with the concepts herein provide high performance synchronization.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
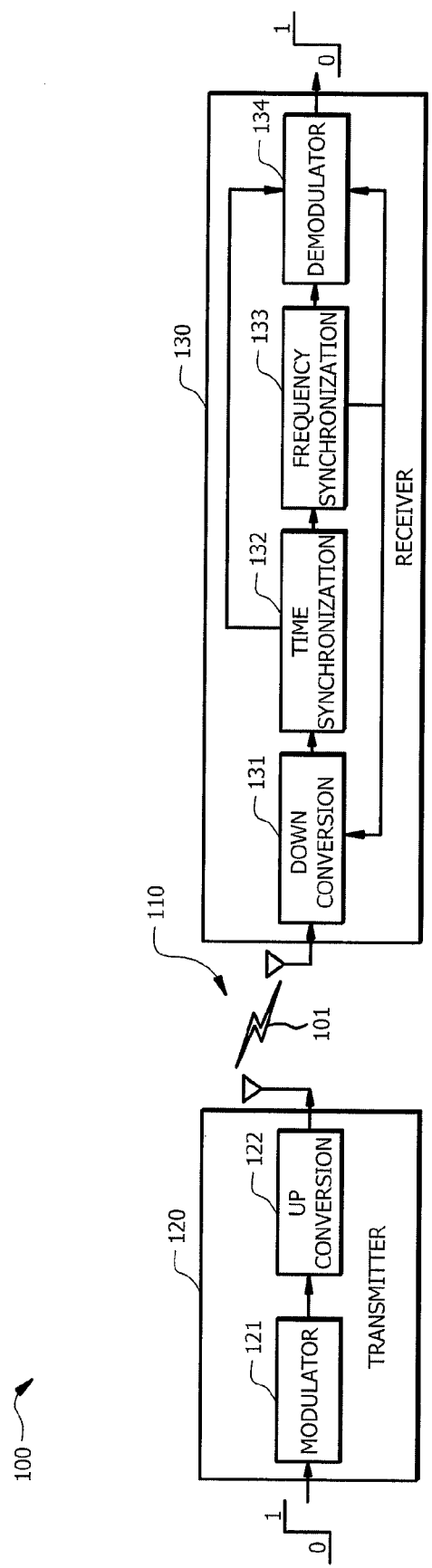
FIG. 1 shows a system adapted to provide time synchronization and/or frequency synchronization according to embodiments of the present invention.

FIG. 1 shows a system adapted to provide time and/or frequency synchronization according to the concepts herein. Specifically, FIG. 1 shows system 100 adapted to provide digital data communications in the form of binary information transmitted as signal 101 via transmission medium 110 from transmitter 120 to receiver 130. For example, various data (e.g., digitized voice, video, multimedia, and/or other data) may be provided to transmitter 120 by one or more data sources. Modulator circuit 121 of transmitter 120 may operate to modulate the data for communication system transmission, such as by varying one or more parameters (e.g., frequency, phase, or amplitude) of a particular carrier wave (e.g., a square wave or sinusoidal wave). The carrier waive may be up-converted by up-conversion circuit 122 to a transmission frequency utilized by system 100, whereby the modulated carrier wave is transmitted into transmission medium 110 as signal 101. Upon receiving the modulated carrier wave via transmission medium 110, down-conversion circuit 131 may down-convert the modulated carrier wave from a transmission frequency utilized by system 100 to an intermediate frequency (IF) or baseband frequency used by receiver 130. Thereafter, demodulator circuit 134 may demodulate and decode the received signal to output an estimate of the original data to one or more data sink.

The signal as received and processed by receiver 130 may be corrupted or otherwise degraded by effects of the transmission medium, the transmitter circuitry, and/or circuitry of the receiver itself. For example, clocks implemented by the transmitter and receiver with respect to the carrier wave may not be synchronized, propagation delays may introduce timing differences with respect to the signals at the transmitter and receiver, etc., thereby presenting issues with respect to timing synchronization. Similarly, manufacturing differences with respect to crystals, mixers, and other circuitry may introduce frequency differences presenting issues with respect to frequency synchronization. Accordingly, systems and methods operable in accordance with concepts herein provide time and/or frequency synchronization with respect to digital signal communications. Such time and frequency synchronization may, for example, be utilized by receiver 130 in demodulating and decoding a received signal to make an estimate of the original data transmitted by transmitter 120. Consistent with the foregoing, receiver 130 of the illustrated embodiment includes time synchronization circuit 132 operable to provide time synchronization according to concepts herein and frequency synchronization circuit 133 operable to provide frequency synchronization according to concepts herein.

It should be appreciated that, although only a single transmitter and receiver are shown in the embodiment of system 100 illustrated in FIG. 1, communication systems adapted according to embodiments of the present invention may include any number of transmitters and/or receivers. System 100 may, for example, comprise one or more computer network systems (e.g., PANs, LANs, MANs, WANs, the Internet, etc.), communication systems (e.g., the PSTN, cellular networks, cable transmission systems, etc.), mesh networks (e.g., Z-WAVE network, ZIGBEE network, etc.), and/or like systems that may comprise a plurality of transmitters and/or receivers. However, system 100 of embodiments may comprise a single point-to-point transmitter and receiver pair.

Although the illustrated embodiment of system 100 represents transmission medium 110 as free space, wherein signal 101 comprises a wireless signal, it should be appreciated that transmission medium 110 may comprise different forms of media. For example, transmission medium 110 may comprise a wireline medium, such as coaxial cable, microstrip line, data bus, etc. Transmission medium 110 of embodiments may comprise a combination of media, such as wireless and wireline and/or combinations of different types of wireless and wireline media.

System 100 may implement various modulation techniques with respect to the communication of data thereby. For example, system 100 of embodiments may utilize non-coherent modulation techniques, such as frequency-shift keying (FSK), differentially coherent modulation techniques, such as differential phase-shift keying (DPSK), and/or other digital modulation techniques. Accordingly, circuitry of transmitter 120 and receiver 130, including modulator circuit 121, demodulator circuit 134, time synchronization circuit 132, and/or frequency synchronization circuit 133, of embodiments may be adapted to accommodate the use of one or more such modulation technique.

Figure 2A:
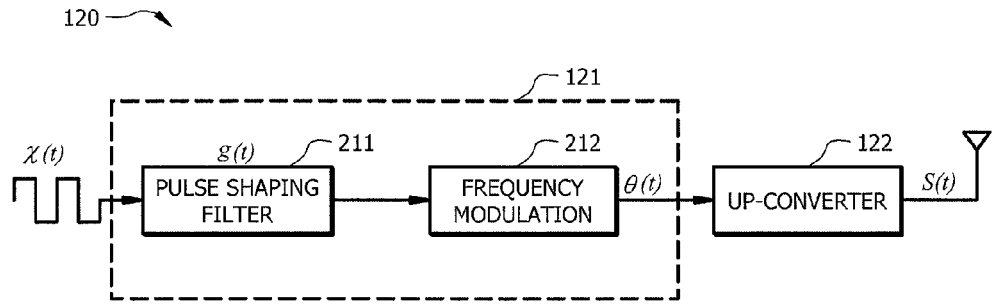
FIGS. 2A and 2B show detail with respect to embodiments of the transmitter of FIG. 1.
Figure 2B:
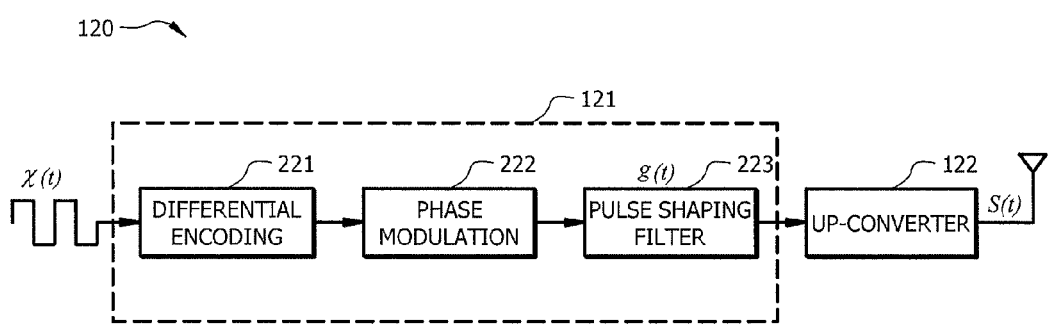

FIGS. 2A and 2B show detail with respect to configurations of transmitter 120 utilized according to embodiments of the present invention. For example, FIG. 2A shows transmitter 120 configured for FSK modulation operation. In supporting FSK modulation of the signals, modulator circuit 121 of FIG. 2A is shown as including pulse shaping filter 211 and FSK frequency modulation circuit 212 operable to provide FSK modulation. FIG. 2B shows transmitter 120 configured for DPSK modulation operation. In supporting DPSK modulation of the signals, modulator circuit 121 of FIG. 2B is shown as including differential encoding circuit 221, phase modulation circuit 222, and pulse shaping filter 223 operable to provide DPSK modulation operation.

Figure 3:
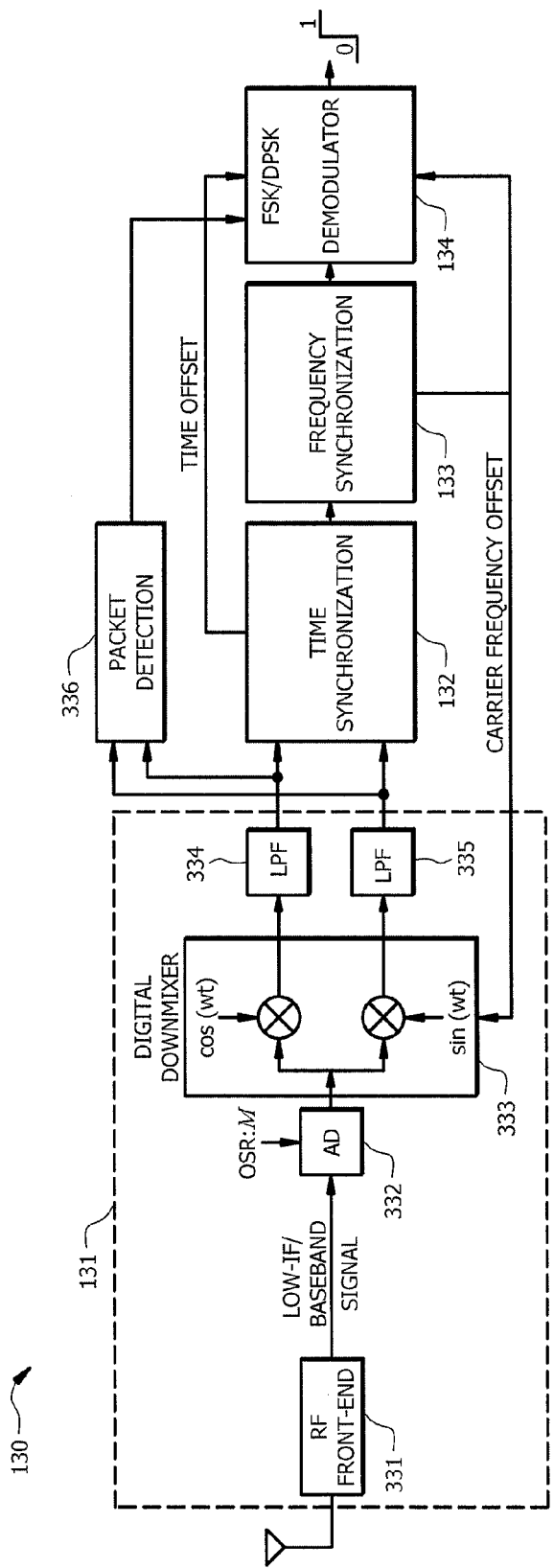
FIG. 3 shows detail with respect to embodiments of the receiver of FIG. 1.

FIG. 3 shows detail with respect to configurations of receiver 130 utilized according to embodiments of the present invention. For example, down-conversion circuit 131 illustrated in FIG. 3 is shown as including radio frequency (RF) front-end circuit 331, analog-to-digital (AD) converter circuit 332, digital downmixer circuit 333, and low pass filters (LPFs) 334 and 335 providing received signals to time synchronization circuit 132 and frequency synchronization circuit 133. Accordingly, receiver 130 illustrated in FIG. 3 comprises a digital receiver in which the time synchronization and frequency synchronization functionality is implemented in the digital domain. For completeness, receiver 130 illustrated in FIG. 3 is shown as including packet detection circuit 336 providing received packet information to demodulator circuit 134. Demodulator circuit 134 of FIG. 3 is shown as comprising FSK and/or DPSK demodulation functionality to accommodate corresponding FSK modulation and/or DPSK modulation configurations of transmitter 120.

Figure 4:
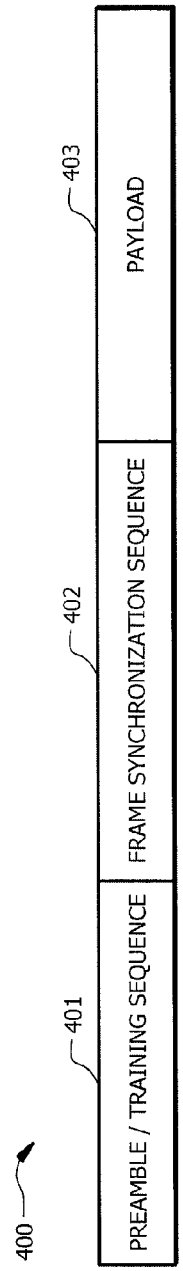
FIG. 4 shows an exemplary packet comprising a preamble or training sequence as may be utilized in accordance with embodiments of the present invention.

In operation according to embodiments, the time and frequency synchronization functionality of receiver 130 provides training sequence or preamble-based synchronization with respect to non-coherent modulated signals (e.g., FSK modulated signals) and/or differentially coherent modulated signals (e.g., DPSK modulated signals). FIG. 4 shows a preamble or training sequence as may be utilized in time and/or frequency synchronization operation in accordance with embodiments of the invention. Specifically, FIG. 4 shows packet 400 comprising preamble (also referred to as a training sequence) 401, frame synchronization sequence 402, and payload 403. Training sequence 401 of embodiments comprises a predefined signal or sequence, typically prefixed before the payload of a packet, used for such purposes as packet detection, auto-gain control (AGC), time and frequency synchronization, etc. Frame synchronization sequence 402 of embodiments comprises information to indicate the particular frame to which the packet belongs, the ordering of the packet within the frame, etc. Payload 403 of embodiments comprises the payload data carried by the packet, such as digital content, encapsulated packet data, control data, etc.

The predefined signal or sequence of training sequence 401 is known to both the transmitter and receiver communicating in system 100. For example, embodiments of the invention provide training sequence-based methods for time and frequency synchronization for systems, such as BLE systems, Z-WAVE systems, CDMA systems, global system for mobile (GSM) communication systems, emergency alert systems, wireless LAN systems, BLUETOOTH systems, RFID systems, OFDM systems, ZIGBEE systems, etc., implementing communications protocols in which predetermined training sequences are utilized.

Figure 5:
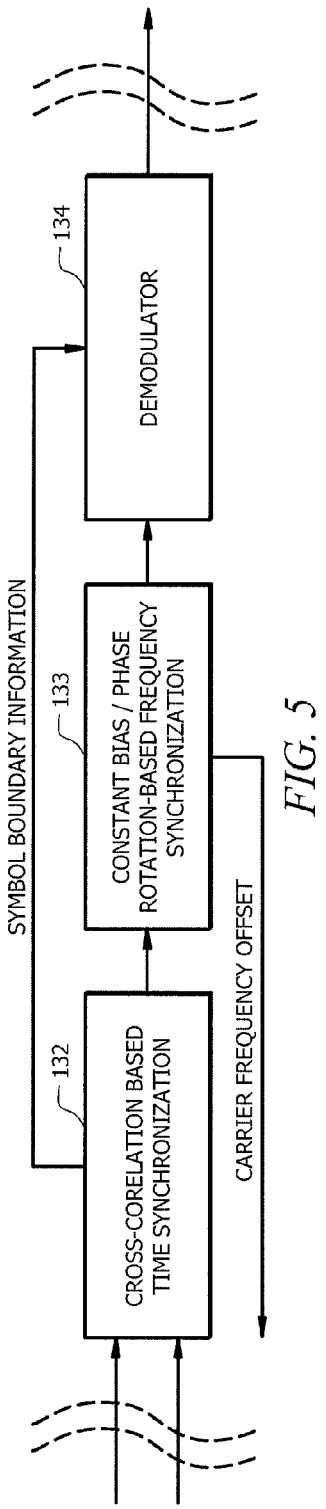
FIG. 5 shows detail with respect to the time synchronization circuit and frequency synchronization circuit of embodiments of the receiver of FIG. 3.

Additional detail with respect to the time and frequency synchronization functionality of non-coherent differential receiver embodiments of receiver 130 adapted to provide training sequence-based synchronization is shown in FIG. 5. In particular, FIG. 5 shows an embodiment of time synchronization circuit 132 adapted to provide cross-correlation based time synchronization operation and an embodiment of frequency synchronization circuit 132 adapted to provide constant bias and/or phase rotation based frequency synchronization operation in accordance with concepts here.

In exemplary operation of the receiver circuitry of FIG. 5, let the input square wave signal be:

$$x(t) = \sum_{n=-\infty}^{+\infty} x(n)\Pi((t - nT_b)/T_b), \quad (1)$$

where $x(n) \in \{\pm 1\}$, $$\Pi(t/T_b) = \begin{cases} 1/T_b, & |t| < T_b/2 \\ 0, & \text{others} \end{cases}$$

is a rectangle with duration $T_b$. For systems implementing FSK modulation, the received baseband signal is given by:

$$s(k) = \cos[\theta(k) + \phi_0] + w_0(k), \quad (2)$$

where $$\theta(k) = 2\pi h \int_{-\infty}^{kT_s} \sum_{n=-\infty}^{k} x[n]g(\tau - nT_b)d\tau,$$

g(t) is the time response of pulse shaping filter, and $w_0(k)$ is the additive white Gaussian noise (AWGN). For systems implementing DPSK modulation, the received baseband signal is given by:

$$s(k) = g(k)\cos[\theta(k) + \phi_0] + w_0(k), \quad (3)$$

where $\theta(k) = \theta(k-1) + \Delta\theta_n$, $\Delta\theta_n$ is the mapping of binary signals to phase shift.

Embodiments of the present invention provide for time synchronization using a technique for mitigating the effect of CFO with respect to the received signal. Accordingly, configurations of time synchronization circuit 132 implementing cross-correlation based time synchronization are adapted to mitigate the effect of CFO. For example, embodiments of time synchronization circuit 132 utilize a second-order differential performed on the received training sequence in mitigating the effect of CFO.

Figure 6:
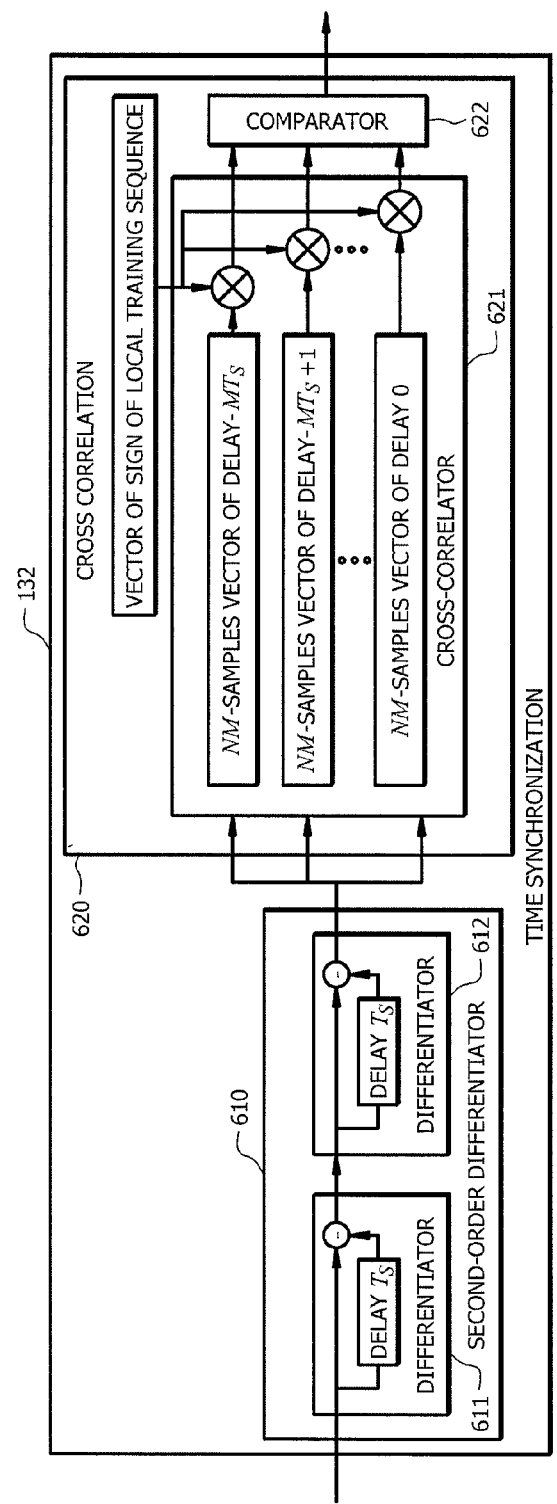
FIG. 6 shows further detail with respect to embodiments of the time synchronization circuit of FIG. 5.

FIG. 6 shows detail with respect to an embodiment of time synchronization circuit 132 implementing cross-correlation based time synchronization adapted to mitigate the effect of CFO in accordance with concepts herein. Operation in accordance with the embodiment shown in FIG. 6 implements a cross-correlation with respect to results provided by the aforementioned second-order differential and results derived from a local sequence (e.g., a local instance of the training sequence). Accordingly, time synchronization circuit 132 illustrated in FIG. 6 includes second-order differentiator circuit 610 and cross-correlation circuit 620.

In operation of embodiments of time synchronization circuit 132 shown in FIG. 6, second-order differentiation is performed on the received training sequence. As shown in the illustrated embodiment, such second-order differentiation may be performed differentiator circuits 611 and 612. Output of the first-order differentiator (differentiator circuit 611) in a FSK modulation implementation is given by:

$$d(k) = I(k)Q(k-1) - Q(k)I(k-1) \quad (4)$$
$$= \sin(2\pi h \tilde{x}(k)T_s + 2\pi f_\Delta T_s) + \tilde{w}_0(k)$$

$$\text{where } \tilde{x}(k) = \sum_{l=-\infty}^{\lfloor k/M \rfloor} x(l)g(k-l),$$

$f_\Delta$ is the CFO between the transmitter and receiver, and $\tilde{w}_0(k)$ is the differential of additive white Gaussian noise (AWGN). Output of the first-order differentiator (differentiator circuit 611) in a DPSK modulation implementation is given by:

$$d(k) = I(k)Q(k-1) - Q(k)I(k-1) \quad (5)$$
$$= g(k)\sin(\Delta\theta_n + 2\pi f_\Delta T_s) + \tilde{w}_0(k).$$

Using the approximation $\sin(x) \approx x$, $x \ll 1$ (i.e., when x is very small, $\sin(x)$ can be approximated as x), equation (4) above may be simplified as:

$$d(k) \approx 2\pi h \tilde{x}(k)T_s + 2f_\Delta T_s + \tilde{w}_0(k), \quad (6)$$

and similarly equation (5) above may be simplified as:

$$d(k) \approx g(k)(\Delta\theta_n + 2\pi f_\Delta T_s) + \tilde{w}_0(k). \quad (7)$$

Using the foregoing, output of second-order differentiator (differentiator circuit 612), at time instance k, in a FSK modulation implementation can be represented by:

$$\hat{d}(k) = d(k) - d(k-1) = 2\pi h \sum_{l=-\infty}^{\lfloor k/M \rfloor} x(l)[g(k-l) - g(k-1-l)] + \tilde{w}(l), \quad (8)$$

and in a DPSK modulation implantation can be represented by:

$$\hat{d}(k)=d(k)-d(k-1)=\Delta\theta_k[g(k)-g(k-1)]+\tilde{w}(k). \quad (9)$$

It can be appreciated from the foregoing that the constant bias induced by CFO is mitigated in the output of second-order differentiator. In particular, the first terms ($2\pi h \tilde{x}(k)T_s$ and $\Delta\theta_n$) in equations (4) and (5) for the first-order differentiator represent the transmitted training sequence signal, the second terms ($2\pi f_\Delta T_s$) in equation (4) and (5) represent the error caused by CFO, and the third terms ($\tilde{w}_0(k)$) represent the AWGN noise. In equations (8) and (9) for the second-order differentiator the terms representing the error caused by CFO are eliminated due to their being a constant in the first-order differential output. That is, the constant bias induced by CFO is mitigated in the output of second-order differential.

In operation according to embodiments, a cross-correlation is performed with respect to results provided by the aforementioned second-order differential to identify the training sequence timing in the received signal. For example, cross-correlator circuit 621 may operate to perform a cross-correlation between the second-order differential vector and a vector corresponding to the predetermined training sequence. In operation according to embodiments, a vector of the sign of the training sequence (e.g., a locally stored instance of the pre-known training sequence) may be generated at receiver, or otherwise provided to the receiver, for cross-correlation with the second-order differential vector to estimate the symbol boundary, and thus the timing, according to embodiments. Embodiments of the invention may utilized the vector of the sign (i.e., disregarding magnitude information) of a local instance of the training sequence, whereby the sign vectors are cross-correlated, to provide a low complexity circuit implementation that provides highly reliable symbol boundary estimates.

Cross-correlation of the second-order differential vector with the local vector of the sign of training sequence is performed according to embodiments in accordance with the following:

$$R(k) = D(k)C = \sum_{r=k-NM-1}^{k} \hat{d}(r)c(r), \quad (10)$$

where $D(k)=[\tilde{d}(k-NM-1),\tilde{d}(k-NM-2), \ldots \hat{d}(k)]$ is the second-order differential vector of received training sequence, $C=[c(0), c(1), \ldots c(NM-1)]$, $c(i) \in \{+1,-1\}$ is the vector of sign of local training sequence, and N is the number of training sequence symbols. In operation according to embodiments, the cross-correlation is performed within a moving window $[-M-1, M-1]$, wherein the sampling index exhibiting the peak (i.e., having the greatest cross-correlation as may be determined by comparator 622) may be identified as a symbol boundary, in accordance with the following:

$$k_{ST} = \operatorname*{argmax}_{k \in [-M-1, M-1]} (D(k)). \quad (11)$$

From the foregoing, it can be appreciated that time synchronization, such as for packet-based communication systems implementing FSK or DPSK modulation, for generating a symbol boundary estimation responsive to a complex baseband signal of preamble/training sequence is provided according to embodiments. In accordance with the foregoing, operation to provide such time synchronization may comprise performing a differential with one sampling point delay on the differential sequence of received training sequence to generate a second-order differential vector and calculating a cross-correlation between the second-order differential vector and a vector based upon a local instance of the training sequence (e.g., $C=[c(0), c(1), \ldots c(NM-1)]$, $c(i)\in\{+1,-1\}$). This cross-correlation may be calculated along a moving window (e.g., $[-M-1, M-1]$) using $$k_{ST} = \operatorname*{argmax}_{k \in [-M-1, M-1]} (D(k)).),$$

wherein the symbol boundary for the training sequence is identified from the peak sampling index.

Figure 7:
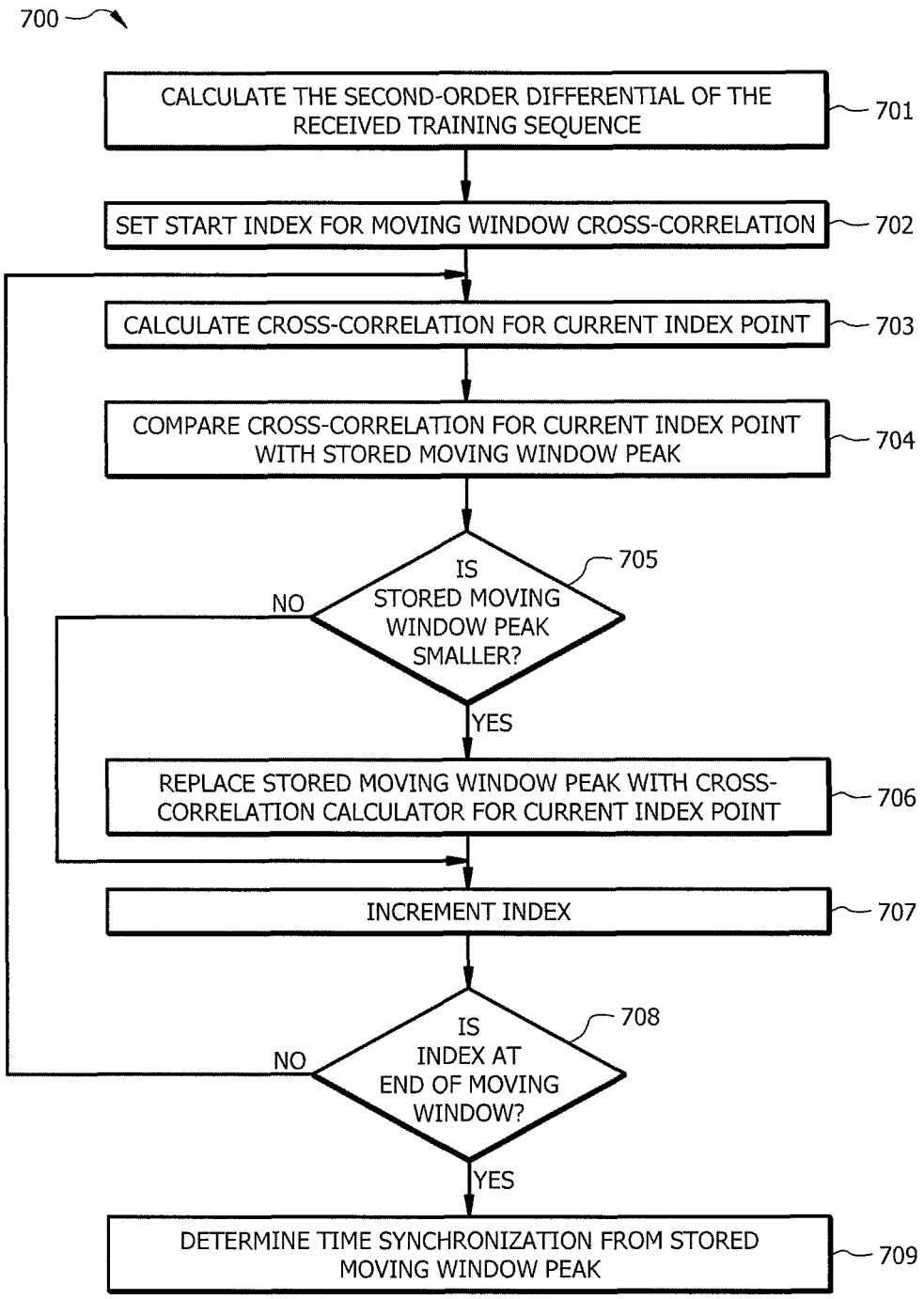
FIG. 7 shows a flow diagram of operation in accordance with embodiments of the time synchronization circuit of FIG. 6.

FIG. 7 shows exemplary operation of an embodiment of time synchronization circuit 132 illustrated in FIG. 6 as flow 700. At block 701 of the illustrated embodiment of flow 700, the second-order differential of the received training sequence is calculated by second-order differentiator circuit 610. Thereafter, blocks 702-708 perform cross-correlation using a vector of this second-order differential and a vector based upon a local instance of the training sequence according to embodiments of cross-correlation circuit 620.

At block 702 of the illustrated embodiment, a start index for the moving window cross-correlation is established. For example, the start index may be set as $N_0=P_{cur}-(N-1)M$, $l=-(M-1)$, $P=0$. The cross-correlation of the vector of the second-order differential and the vector based upon a local instance of the training sequence is calculated for a current index point of the moving window is calculated (e.g., calculate NM point cross-correlation as $$R(l) = \sum_{r=N_0-l-NM-1}^{N_0-l} \hat{d}(r)c(r))$$

at block 703. At block 704 the cross-correlation for the current moving window index point is compared with a stored moving window peak correlation value (e.g., P is compared with R(l)) and at block 705 a determination is made as to whether the stored moving window peak is smaller than the cross-correlation for the current index point in the moving window. If the stored moving window peak is smaller, then the stored moving window peak is replaced with the cross-correlation for the current index point (e.g., if P is smaller, P is replaced by R(l) and stored for the sampling index l as the new peak cross-correlation) at block 706. However, if the stored moving window peak is not smaller than the cross-correlation for the current index point in the moving window, processing according to the illustrated embodiment proceeds to block 707. At block 707, the moving widow index is incremented (e.g., l=l+1). Thereafter, a determination is made as to whether the end of the moving window has been reached (e.g., if l>M-1) at block 708 of the illustrated embodiment. If the cross-correlation has not been performed for all points in the moving window, processing according to the illustrated embodiment returns to block 703 to perform another iteration of the moving window cross-correlation. However, if the cross-correlation has been performed for all points in the moving window, processing according to flow 700 of FIG. 7 proceeds to block 709 wherein time synchronization is determined from the stored moving window peak cross-correlation.

It should be appreciated that the calculations, cross-correlations, and comparisons performed in the illustrated embodiment of flow 700 may be performed using only shifters and adders. Accordingly, embodiments in accordance with the aspects of such a configuration are particularly well suited for low power, low cost system implementations.

Having described embodiments to provide time synchronization in accordance with concepts herein above, it should appreciated that embodiments may additionally or alternatively provide frequency synchronization in accordance with concepts herein. For example, embodiments of the present invention provide for frequency synchronization using a technique for estimating CFO using a constant bias induced with respect to the received signal by CFO. Additionally or alternatively, embodiments of the present invention provide for frequency synchronization using a technique for estimating CFO using phase rotation caused by CFO.

Figure 8:
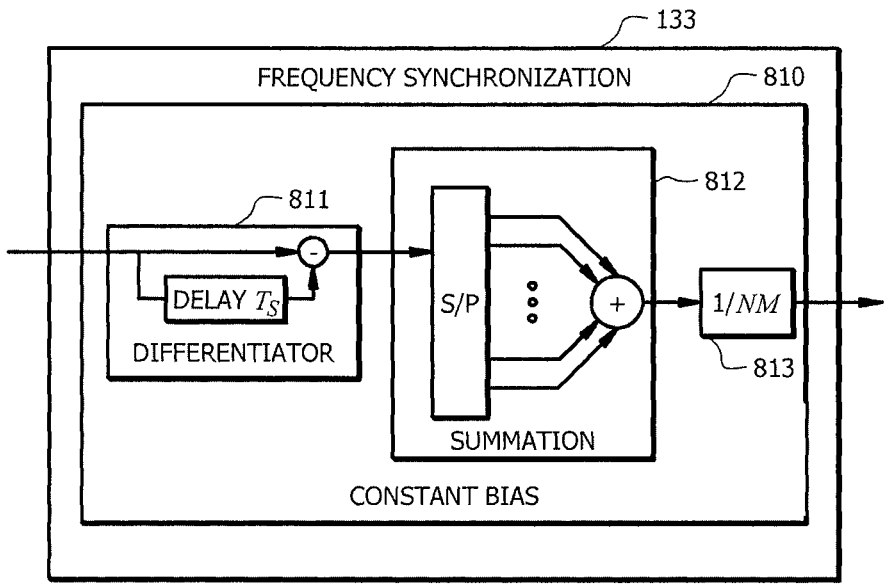
FIG. 8 shows further detail with respect to embodiments of the frequency synchronization circuit of FIG. 5.

FIG. 8 shows detail of a constant bias based configuration of frequency synchronization circuit 133, wherein the constant bias induced by CFO in a differential sequence of the received signal is utilized by constant bias circuitry 810 for frequency synchronization. For example, the constant bias induced by CFO in the first-order differential of received training sequence is utilized in providing frequency synchronization in accordance with some embodiments of the invention. In operation of the illustrated embodiment of constant bias circuitry 180, a first-order differential sequence of the received training sequence is provided by differentiator circuit 811 and a summation and average over the first-order differential sequence is performed by summation circuitry 812 and divide circuitry 813 (which can be implemented by a right shifter where NM is chosen as a power of 2). The summation of the first-order differential sequence may be represented as:

$$S = \sum_{k=N_p}^{N_p+NM-1} d(k) \quad (12)$$

$$= 2\pi h T_s \sum_{k=N_p}^{N_p+NM-1} \tilde{x}(k) + \sum_{k=N_p}^{N_p+NM-1} 2\pi f_\Delta T_s + \sum_{k=N_p}^{N_p+NM-1} w_0(k),$$

wherein $N_p$ is the start index of the training sequence (e.g., $N_p$ may be determined in the sampling points after the above time synchronization operation), d(k) is the element of differential output of the received sampling points, N represents the number of symbols of the training sequence, and M represents the number of sampling points per symbol. It should be appreciated that the first term $$\left( 2\pi h T_s \sum_{k=N_p}^{N_p+NM-1} \tilde{x}(k) \right)$$

of equation (12) is the summation of the training sequence. The training sequence, and thus the summation thereof, is known at the receiver. Thus, CFO can be estimated by the following:

$$2\pi f_\Delta T_s = \frac{S - S_0}{NM}, \quad (13)$$

where $S_0 = 2\pi h T_s \sum_{k=N_p}^{N_p+NM-1} \tilde{x}(k)$ is the predefined constant at the receiver.

Figure 9:
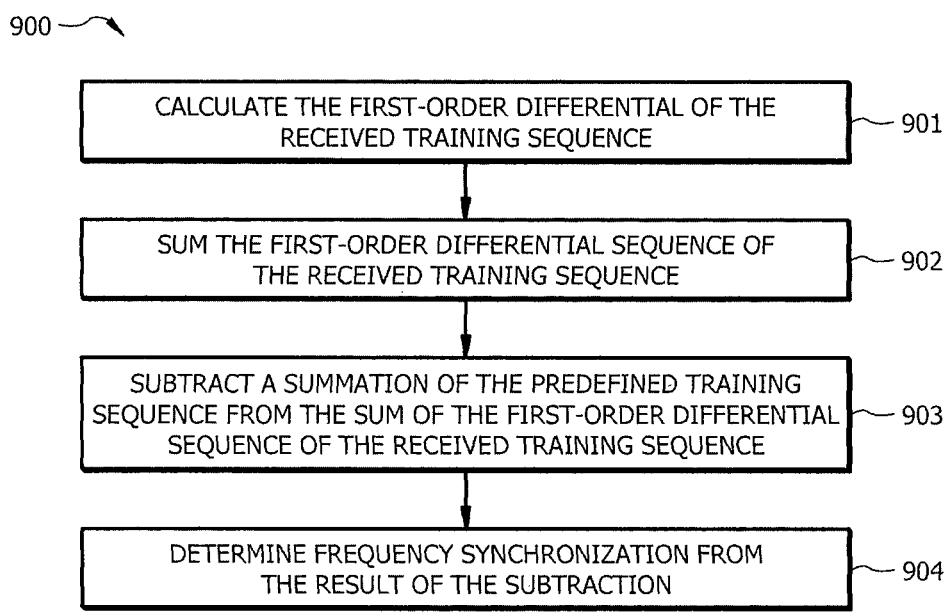
FIG. 9 shows a flow diagram of operation in accordance with embodiments of the frequency synchronization circuit of FIG. 8.

FIG. 9 shows exemplary operation of an embodiment of frequency synchronization circuit 133 illustrated in FIG. 8 as flow 900. At block 901 of the illustrated embodiment of flow 900, the first-order differential of the received training sequence is calculated by differentiator circuit 811. Thereafter, at block 902 a summation of the first-order differential sequence of the received training sequence is performed by summation circuit 812 (e.g., providing $$2\pi h T_s \sum_{k=N_p}^{N_p+NM-1} \tilde{x}(k) + \sum_{k=N_p}^{N_p+NM-1} 2\pi f_\Delta T_s + \sum_{k=N_p}^{N_p+NM-1} w_0(k),$$

wherein the first term $$\left( 2\pi h T_s \sum_{k=N_p}^{N_p+NM-1} \tilde{x}(k) \right)$$

represents the transmitted training sequence, the second term $$\left( \sum_{k=N_p}^{N_p+NM-1} 2\pi f_\Delta T_s \right)$$

represents the error introduced by CFO, and the third term $$\left( \sum_{k=N_p}^{N_p+NM-1} w_0(k) \right)$$

represents the AWGN noise). Accordingly, a summation of the predefined training sequence $$\left( S_0 = 2\pi h T_s \sum_{k=N_p}^{N_p+NM-1} \tilde{x}(k) \right),$$

as known by the receiver, is subtracted from the summation of the first-order differential sequence of the received training sequence to estimate the CFO at block 903 of the illustrated embodiment. At block 904 of the illustrated embodiment of flow 900 frequency synchronization is determined from the results of the subtraction performed at block 903.

Figure 10:
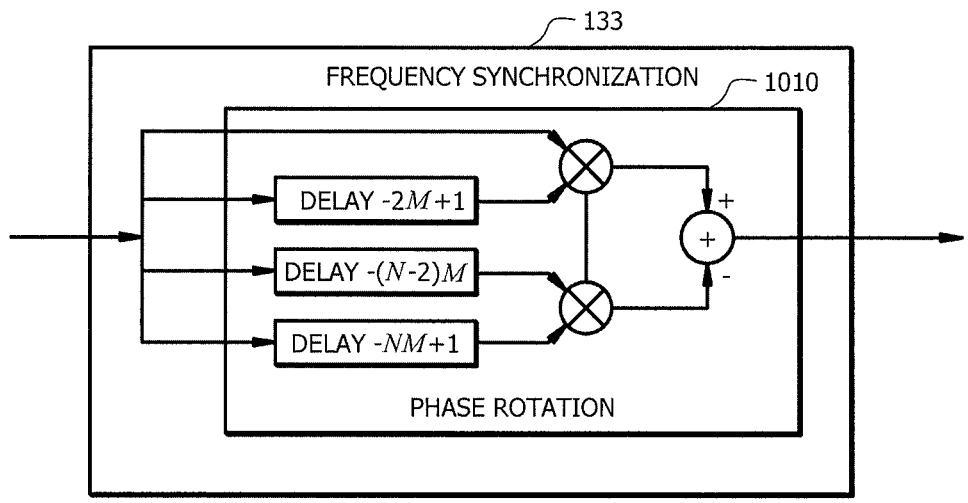
FIG. 10 shows further detail with respect to embodiments of the frequency synchronization circuit of FIG. 5.

FIG. 10 shows detail of a phase rotation based configuration of frequency synchronization circuit 133, wherein, for signals repeated with a time interval, the phase rotation caused by CFO is utilized for frequency synchronization. For example, where a training sequence is a repetitive pattern (e.g., 10101010), CFO can be estimated from an inner product between two portions of the received repeated signal according to the illustrated embodiment. In accordance with the concepts of the embodiment of FIG. 10, the received training sequence signal in baseband, considering CFO, can be written as:

$$r(t)=x(t)e^{j[2\pi f\Delta t+\Delta\Omega]}+n_0(t), \quad (14)$$

where $\Delta t$ is the time interval of repeated signals. Accordingly, if the training sequence is of repetitive pattern, CFO can be estimated by phase rotation circuit 1010 by autocorrelation of the received training sequence and a delayed version of the received training sequence with interval $\Delta t$, wherein the autocorrelation provides an estimate of CFO as a result of the phase rotation caused by CFO.

For example, in a BLE system, the 8-bit training sequence $b_0, b_1, \ldots, b_8$ is "10101010" or "01010101". CFO can be estimated at BLE receiver adapted according to embodiments herein using an autocorrelation of the inner product between the two vectors $b_0, b_1, \ldots, b_5$ and $b_2, b_1, \ldots, b_7$ having a 2 symbol delay calculated in accordance with the following:

$$f_\Delta = \frac{1}{4\pi M}\arctan\left(\sum_{k=0}^{5M} x(k)x^*(k+2M)\right), \quad (15)$$

where $x(k)$ is the sampled data of received training sequence at $k^{th}$ instance, and M is the number of sampling points per bit.

Figure 11:
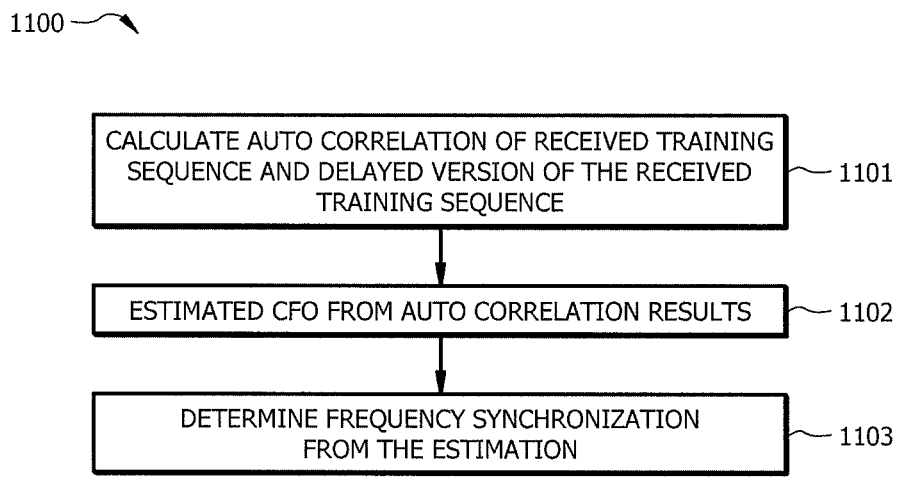
FIG. 11 shows a flow diagram of operation in accordance with embodiments of the frequency synchronization circuit of FIG. 10.
Figure 12:
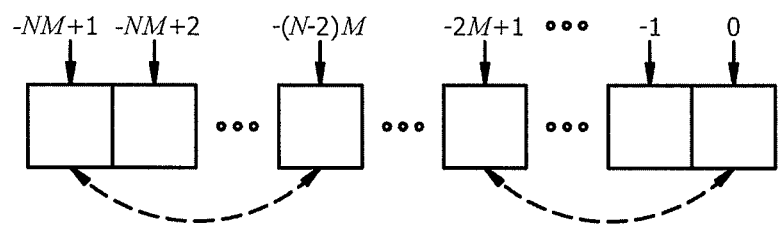
FIG. 12 shows autocorrelation as may be implemented by embodiments of the frequency synchronization circuit of FIG. 10 in accordance with the operation of FIG. 11.

FIG. 11 shows exemplary operation of an embodiment of frequency synchronization circuit 133 illustrated in FIG. 10 as flow 1100. At block 1101 of the illustrated embodiment of flow 1100, the autocorrelation of the vector of sampling points of the received training sequence and delayed versions of the vector (e.g., delayed with interval $\Delta t$) is calculated. Calculation of the autocorrelation at block 1101 of embodiments may comprise calculating a product ($R_0$) between a currently input sampling point (e.g., sampling point with index 0) and a previous sampling point (e.g., sampling point with index $-2M+1$), calculating a product (e.g., $R_1$) between corresponding sampling points of a delayed version of the received training sequence vector (e.g., the sampling point $-(N-2)M$ and the sampling point $-NM+1$), and calculating the autocorrelation of the foregoing products (e.g., $S=S+R_0-R_1$). The foregoing autocorrelation is illustrated in FIG. 12, wherein it can be appreciated that the autocorrelation of the vector according to the illustrated embodiment requires only 8 multipliers and 8 adders. Thereafter, CFO ($f_\Delta$) is estimated from the foregoing autocorrelation (e.g., $$f_\Delta = \frac{1}{4\pi M}\arctan\left(\sum_{k=0}^{5M} x(k)x^*(k+2M)\right)$$

at block 1102. At block 1103 of the illustrated embodiment of flow 1100 frequency synchronization is determined from the results of the CFO estimation.

Figure 13:
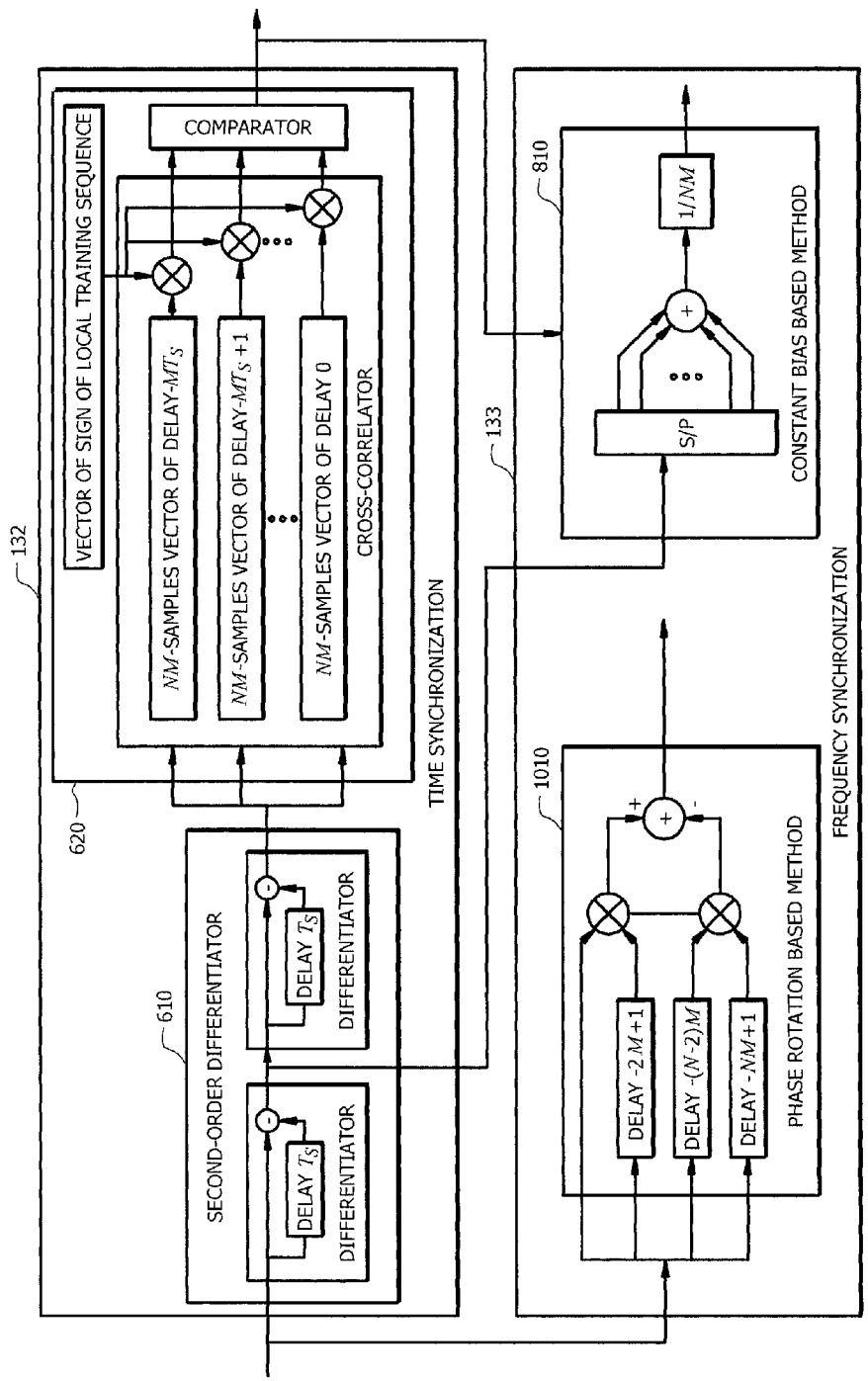
FIG. 13 shows an embodiment including both time synchronization circuitry and frequency synchronization circuitry adapted according to the present invention.

Having described embodiments to provide time synchronization and embodiments to provide frequency synchronization in accordance with concepts herein above, it should appreciated that embodiments may implement such time and frequency synchronization techniques alone or in combination. The embodiment of FIG. 13, for example, shows an implementation including both time synchronization circuitry and frequency synchronization circuitry adapted in accordance with the concepts herein. Moreover, the frequency synchronization circuitry illustrated in the embodiment of FIG. 13 includes circuitry adapted to implement two frequency synchronization techniques, whereby in operation according to embodiments one of the frequency synchronization techniques may be selected with respect to particular operational scenarios. The constant bias based frequency synchronization circuit can be selected for the low cost and low power systems due to its simplicity. On the other hand, the phase rotation based frequency synchronization circuit can be adopted for the system requiring higher performance.

It should be appreciated from the foregoing that embodiments may operate to perform the time and frequency synchronization techniques implemented in some configurations in parallel or partially in parallel. Moreover, time synchronization and frequency synchronization implemented according to embodiments herein may be performed independently, without requiring the results of one synchronization operation for performing the other synchronization operation. For example, time synchronization circuitry of embodiments utilizes a second-order differential to estimate the symbol boundary, eliminating the effect of CFO. Frequency synchronization circuitry of embodiments utilizes autocorrelation of received signals without symbol boundary information. Accordingly, residue or errors in one synchronization result are not carried into the other synchronization result. Additionally, both time synchronization and frequency synchronization of embodiments herein can be implemented with only shifters and adders, which is suitable for low power low cost system implementations.

When implemented in software, elements of the present invention are essentially the code segments to perform the relevant tasks described herein. The program or code segments can be stored in a processor readable medium. The "processor readable medium" may include any medium that can appropriately store the information. Examples of the processor readable medium include an electronic circuit, a semiconductor memory device, a read only memory (ROM), a flash memory, an erasable ROM (EROM), a floppy diskette, a compact disk CD-ROM, an optical disk, a hard disk, an optical medium, etc. The code segments may be executed by one or more host processors suitable for executing the code segments and performing operations in accordance with the concepts herein. Such one or more processors may, for example, comprise general purpose processors (e.g., a processor from the PENTIUM or CORE lines of processors available from Intel Corporation), special purpose processors (e.g., an application specific integrated circuit (ASIC), a field programmable gate array (FPGA), etc.) having the requisite peripherals (e.g., memory, input/output, etc.) in communication therewith. For example, code segments for performing functions of embodiments of the present invention may be stored in the memory of receiver 130, wherein a processor of a digital radio thereof may execute the instructions for providing operation in accordance with the concepts herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A method for frequency synchronization of packet-based communications, the method comprising:
calculating a first-order differential of a received training sequence signal, wherein the training sequence is non-coherently modulated or differentially coherently modulated, wherein a result of the calculating the first-order differential includes a constant bias induced by carrier frequency offset (CFO) in the received training sequence signal;
summing over the first-order differential of the received training sequence signal;
subtracting a summation derived from a known training sequence instance corresponding to the received training sequence from the summation over the first-order differential of the received training sequence signal, wherein the subtracting the summation derived from the known training sequence instance provides an estimation of the constant bias CFO in the received training sequence signal; and
determining the frequency synchronization based upon a result of the subtracting.

2. The method of claim 1, wherein the summing over the first-order differential of the received training sequence signal provides $$2\pi h T_s \sum_{k=N_p}^{N_p+NM-1} \tilde{x}(k) + \sum_{k=N_p}^{N_p+NM-1} 2\pi f_\Delta T_s + \sum_{k=N_p}^{N_p+NM-1} w_0(k)$$

and the summation derived from the known training sequence instance provides $$S_0 = 2\pi h T_s \sum_{k=N_p}^{N_p+NM-1} \tilde{x}(k),$$

and wherein CFO is estimated as $$2\pi f_\Delta T_s = \frac{S - S_0}{NM}.$$

3. The method of claim 1, further comprising:
providing time synchronization of the packet-based communications.

4. The method of claim 3, wherein the time synchronization is provided independently with respect to the frequency synchronization, whereby results of one synchronization are not utilized in performing another synchronization operation.

5. The method of claim 3, wherein the providing time synchronization comprises:
calculating a second-order differential of the received training sequence signal;
calculating a cross-correlation between a second-order differential vector provided by the second-order differential calculation and a vector derived from a known training sequence instance corresponding to the received training sequence; and
determining the time synchronization based upon a peak provided by the cross-correlation.

6. The method of claim 5, wherein the calculating the cross-correlation comprises:
calculating the cross-correlation along a moving window, wherein the peak provided by the cross-correlation comprises a peak identified within the moving window.

7. The method of claim 6, wherein the second-order differential vector is represented by $D(k)=[\hat{d}(k-NM-1),\hat{d}(k-NM-2), \ldots \hat{d}(k)]$, the vector derived from the known training sequence is represented by $C=[c(0),c(1), \ldots c(NM-1)]$, $c(i)\in\{+1,-1\}$, and the moving window in which the cross-correlation is performed is represented by $[-M-1, M-1]$, and wherein the cross-correlation is performed as $$R(k) = D(k)C = \sum_{r=k-NM-1}^{k} \hat{d}(r)c(r).$$

8. The method of claim 6, wherein the peak provided by the cross-correlation comprises a greatest cross-correlation in the moving window determined as $$k_{ST} = \underset{k\in[-M-1,M-1]}{\operatorname{argmax}} (D(k)).$$

9. The method of claim 5, wherein the calculating the cross-correlation comprises:
establishing an index for a moving window cross-correlation;
calculating the cross-correlation of the second-order differential vector and the vector derived from the known training sequence instance for a current index point of the moving window;
comparing the cross-correlation for the current moving window index point with a stored moving window peak correlation value;
determining whether the stored moving window peak is smaller than the cross-correlation for the current index point in the moving window and, if the stored moving window peak is smaller, replacing the stored moving window peak with the cross-correlation for the current index point;
incrementing the moving window index; and
repeating the calculating the cross-correlation, the comparing the cross-correlation, and the determining whether the stored moving window peak is smaller until an end of the moving window is reached.

10. The method of claim 9, wherein the establishing an index comprises setting $N_0=P_{cur}-(N-1)M$, $l=-(M-1)$, $P=0$, the calculating the cross-correlation comprises calculating NM point cross-correlation as $$R(l) = \sum_{r=N_0-l-NM-1}^{N_0-l} \hat{d}(r)c(r),$$

the comparing the cross-correlation comprises comparing P with R(l)), the replacing the stored moving window peak comprises replacing P by R(l), and the incrementing the moving window index comprises setting l=l+1.

11. A method for frequency synchronization of packet-based communications, the method comprising:
calculating a first-order differential of a received training sequence signal, wherein the training sequence is non-coherently modulated or differentially coherently modulated, wherein the calculating the first-order differential is performed as part of calculating a second-order differential of the received training sequence signal for time synchronization of the packet-based communications;
summing over the first-order differential of the received training sequence signal;
subtracting a summation derived from a known training sequence instance corresponding to the received training sequence from the summation over the first-order differential of the received training sequence signal; and
determining the frequency synchronization based upon a result of the subtracting.

12. A system for frequency synchronization of packet-based communications, the system comprising:
a first-order differentiator circuit operable to calculate a first-order differential of a received training sequence signal, wherein the training sequence is non-coherently modulated or differentially coherently modulated, wherein a result of the first-order differential calculation includes a constant bias induced by carrier frequency offset (CFO) in the received training sequence signal;
a summation circuit operable to provide a summation over the first-order differential of the received training sequence signal, subtract a summation derived from a known training sequence instance corresponding to the received training sequence from the summation over the first-order differential of the received training sequence signal, and provide a result for use in determining the frequency synchronization, wherein a result of subtraction of the summation derived from the known training sequence instance provides an estimation of the constant bias CFO in the received training sequence signal.

13. The system of claim 12, wherein the summation over the first-order differential of the received training sequence signal provides $$2\pi h T_s \sum_{k=N_p}^{N_p+NM-1} \tilde{x}(k) + \sum_{k=N_p}^{N_p+NM-1} 2\pi f_\Delta T_s + \sum_{k=N_p}^{N_p+NM-1} w_0(k)$$

and the summation derived from the known training sequence instance provides $$S_0 = 2\pi h T_s \sum_{k=N_p}^{N_p+NM-1} \tilde{x}(k),$$

and wherein CFO is estimated as $$2\pi f_\Delta T_s = \frac{S - S_0}{NM}.$$

14. The system of claim 12, further comprising:
time synchronization circuitry operable to provide time synchronization of the packet-based communications.

15. The system of claim 14, wherein the time synchronization is provided independently with respect to the frequency synchronization, whereby results of one synchronization are not utilized in performing another synchronization operation.

16. The system of claim 14, wherein the time synchronization circuitry comprises:
a differentiator circuit operable to calculate a second-order differential of a received training sequence signal, wherein the training sequence is non-coherently modulated or differentially coherently modulated;
a cross-correlator circuit coupled to an output of the differentiator circuit and operable to calculate a cross-correlation between a second-order differential vector provided by the second-order differential calculation circuit and a vector derived from a known training sequence instance corresponding to the received training sequence and to identify a peak provided by the cross-correlation for use in determining the time synchronization.

17. The system of claim 16, wherein the cross-correlator circuit is operable to calculate the cross-correlation along a moving window, wherein the peak provided by the cross-correlation comprises a peak identified within the moving window.

18. The system of claim 17, wherein the second-order differential vector is represented by $D(k)=[\hat{d}(k-NM-1), \hat{d}(k-NM-2), \ldots \hat{d}(k)]$, the vector derived from the known training sequence is represented by $C=[c(0),c(1),\ldots c(NM-1)]$, $c(i)\epsilon\{+1,-1\}$, and the moving window in which the cross-correlation is performed is represented by $[-M-1, M-1]$, and wherein the cross-correlation performed by the cross-correlator circuit is performed in accordance with $$R(k) = D(k)C = \sum_{r=k-NM-1}^{k} \hat{d}(r)c(r).$$

19. The system of claim 18, wherein the peak provided by the cross-correlator circuit comprises a greatest cross-correlation in the moving window determined in accordance with $$k_{ST} = \underset{k\in[-M-1,M-1]}{\operatorname{argmax}} (D(k)).$$

20. The system of claim 16, wherein the cross-correlator circuit is operable to establish an index for a moving window cross-correlation, calculate the cross-correlation of the second-order differential vector and the vector derived from the known training sequence instance for a current index point of the moving window, compare the cross-correlation for the current moving window index point with a stored moving window peak correlation value, determine whether the stored moving window peak is smaller than the cross-correlation for the current index point in the moving window and, if the stored moving window peak is smaller, replace the stored moving window peak with the cross-correlation for the current index point, increment the moving window index, and repeat the calculating the cross-correlation, the comparing the cross-correlation, and the determining whether the stored moving window peak is smaller until an end of the moving window is reached.

21. The system of claim 20, wherein the cross-correlator circuit is operable to establish index by setting $N_0=P_{cur}-(N-1)M$, $l=-(M-1)$, $P=0$, calculate the cross-correlation by calculating NM point cross-correlation as $$R(l) = \sum_{r=N_0-l-NM-1}^{N_0-l} \hat{d}(r)c(r),$$

compare the cross-correlation by comparing P with R(l)), replace the stored moving window peak by replacing P by R(l), and increment the moving window index by setting $l=l+1$.

22. A system for frequency synchronization of packet-based communications, the system comprising:
    a first-order differentiator circuit operable to calculate a first-order differential of a received training sequence signal, wherein the training sequence is non-coherently modulated or differentially coherently modulated, wherein the first-order differential is calculated as part of a calculation of a second-order differential of the received training sequence signal for time synchronization of the packet-based communications; and
    a summation circuit operable to provide a summation over the first-order differential of the received training sequence signal, subtract a summation derived from a known training sequence instance corresponding to the received training sequence from the summation over the first-order differential of the received training sequence signal, and provide a result for use in determining the frequency synchronization.

23. A method for frequency synchronization of packet-based communications, the method comprising:
    calculating an autocorrelation of a vector of sampling points of a received training sequence signal and a delayed version of the vector, wherein the delayed version of the vector is delayed with the interval Δt, and wherein the training sequence is non-coherently modulated or differentially coherently modulated, and wherein the training sequence is a repetitive pattern;
    estimating carrier frequency offset (CFO) from results of the autocorrelation; and
    determining the frequency synchronization based upon the CFO estimate.

24. The method of claim 23, wherein the calculating the autocorrelation further comprises:
    calculating a product ($R_0$) between a currently input sampling point and a previous sampling point;
    calculating a product ($R_1$) between corresponding sampling points of a delayed version of the received training sequence vector; and
    calculating an autocorrelation of the products ($R_0$ and $R_1$).

25. The method of claim 23, further comprising:
    providing time synchronization of the packet-based communications.

26. The method of claim 25, wherein the time synchronization is provided independently with respect to the frequency synchronization, whereby results of one synchronization are not utilized in performing another synchronization operation.

27. The method of claim 25, wherein the providing time synchronization comprises:

calculating a second-order differential of the received training sequence signal;
calculating a cross-correlation between a second-order differential vector provided by the second-order differential calculation and a vector derived from a known training sequence instance corresponding to the received training sequence; and
determining the time synchronization based upon a peak provided by the cross-correlation.

28. The method of claim 27, wherein the calculating the cross-correlation comprises:
    calculating the cross-correlation along a moving window, wherein the peak provided by the cross-correlation comprises a peak identified within the moving window.

29. The method of claim 28, wherein the second-order differential vector is represented by $D(k)=[\hat{d}(k-NM-1), \hat{d}(k-NM-2), \ldots \hat{d}(k)]$, the vector derived from the known training sequence is represented by $C=[c(0),c(1),\ldots c(NM-1)]$, $c(i) \in \{+1,-1\}$, and the moving window in which the cross-correlation is performed is represented by $[-M-1, M-1]$, and wherein the cross-correlation is performed as $$R(k) = D(k)C = \sum_{r=k-NM-1}^{k} \hat{d}(r)c(r).$$

30. The method of claim 28, wherein the peak provided by the cross-correlation comprises a greatest cross-correlation in the moving window determined as $$k_{ST} = \underset{k \in [-M-1,M-1]}{\mathrm{argmax}} (D(k)).$$

31. The method of claim 27, wherein the calculating the cross-correlation comprises:
    establishing an index for a moving window cross-correlation;
    calculating the cross-correlation of the second-order differential vector and the vector derived from the known training sequence instance for a current index point of the moving window;
    comparing the cross-correlation for the current moving window index point with a stored moving window peak correlation value;
    determining whether the stored moving window peak is smaller than the cross-correlation for the current index point in the moving window and, if the stored moving window peak is smaller, replacing the stored moving window peak with the cross-correlation for the current index point;
    incrementing the moving window index; and
    repeating the calculating the cross-correlation, the comparing the cross-correlation, and the determining whether the stored moving window peak is smaller until an end of the moving window is reached.

32. The method of claim 31, wherein the establishing an index comprises setting $N_0=P_{cur}-(N-1)M$, $l=-(M-1)$, $P=0$, the calculating the cross-correlation comprises calculating NM point cross-correlation as $$R(l) = \sum_{r=N_0-l-NM-1}^{N_0-l} \hat{d}(r)c(r),$$

the comparing the cross-correlation comprises comparing P with R(l)), the replacing the stored moving window peak comprises replacing P by R(l), and the incrementing the moving window index comprises setting l=l+1.

\* \* \* \* \*

UNITED STATES PATENT AND TRADEMARK OFFICE
CERTIFICATE OF CORRECTION

PATENT NO. : 9,912,512 B2
APPLICATION NO. : 15/063085
DATED : March 6, 2018
INVENTOR(S) : Shaohua Zhao et al.

It is certified that error appears in the above-identified patent and that said Letters Patent is hereby corrected as shown below:

In the Specification

At Column 8, Line number 54, delete the portion of the equation reading "$2f_\Delta T_s$," and replace with --$2^\pi f_\Delta T_s$--.

At Column 9, Line number 47, delete " $D(k)=[\hat{d}(k\text{-}NM\text{-}1), \hat{d}(k\text{-}NM\text{-}2),...\hat{d}(k)]$ ," and replace with -- $D(k) = [\hat{d}(k-NM-1), \hat{d}(k-NM-2),...\hat{d}(k)]$ --.

At Column 10, beginning at Line number 30, delete "$N_o = P_{cur} -(N-1)M, 1 =-(M-1), P=0$" and replace with --$N_0 = P_{cur} -(N-1)M, l =-(M-1), P=0$--.
At Column 10, Line number 46, delete "R(1))" and replace with --R($l$))--.
At Column 10, Line number 52, delete "R(1)" and replace with --R($l$)--.
At Column 10, Line number 53, delete "index 1" and replace with --index $l$--.
At Column 10, Line number 58, delete "1=1+1" and replace with --$l$=$l$+1--.
At Column 10, Line number 60, delete "1>M-1" and replace with --$l$>M-1--.

In the Claims

At Column 16, Claim number 10, Line number 57, delete "$N_o = P_{cur} -(N-1)M, 1 =-(M-1), P=0$" and replace with --$N_0 = P_{cur} -(N-1)M, l =-(M-1), P=0$--.
At Column 16, Claim number 10, Line number 67, delete "R(1))" and replace with --R($l$))--.
At Column 17, Claim number 10, Line number 1, delete "R(1)" and replace with --R($l$)--.
At Column 17, Claim number 10, Line number 2, delete "1=1+1" and replace with --$l$=$l$+1--.
At Column 19, Claim number 21, beginning at Line number 4, delete "$N_o = P_{=cur} -(N-1)M, 1 =-(M-1), P=0$" and replace with --$N_0 = P_{cur} -(N-1)M, l =-(M-1), P=0$--.
At Column 19, Claim number 21, Line number 14, delete "R(1))" and replace with --R($l$))--.
At Column 19, Claim number 21, Line number 16, delete "R(1)" and replace with --R($l$)--.
At Column 19, Claim number 21, Line number 17, delete "1=1+1" and replace with --$l$=$l$+1--.
At Column 20, Claim number 32, Line number 58, delete "$N_o = P_{cur} -(N-1)M, 1 =-(M-1), P=0$" and replace with --$N_0 = P_{cur} -(N-1)M, l =-(M-1), P=0$--.

Signed and Sealed this
Third Day of July, 2018

Andrei Iancu
*Director of the United States Patent and Trademark Office*

CERTIFICATE OF CORRECTION (continued)
U.S. Pat. No. 9,912,512 B2

At Column 21, Claim number 32, Line number 2, delete "R(l))" and replace with --R($l$))--.
At Column 21, Claim number 32, Line number 3, delete "R(l)" and replace with --R($l$)--.
At Column 21, Claim number 32, Line number 4, delete "l=l+1" and replace with --$l$=$l$+1--.